Patented Apr. 19, 1932

1,854,764

UNITED STATES PATENT OFFICE

PHILIP E. ROLLHAUS, OF EAST ORANGE, NEW JERSEY, AND WILLIAM B. STODDARD, OF STAMFORD, CONNECTICUT, ASSIGNORS TO PILOT LABORATORY, INC., OF ARLINGTON, NEW JERSEY, A CORPORATION OF NEW JERSEY

BLEACHING METHODS AND AGENT

No Drawing.  Application filed November 12, 1928.  Serial No. 319,002.

Our invention relates to a process of and agent for bleaching organic matter, such as food stuffs of animal or vegetable origin, waxes and the like, and relates more particularly to a process of and agent for bleaching food stuffs as, for example, flour, cotton seed and other seed meals, oils, fats and the like, which normally contain chromophoric oil bearing materials.

The bleaching of food stuffs not only requires a bleaching agent sufficiently effective and efficient in its action that there is required only a small quantity, too minute to be noticeable in the bleached product, but also an agent that shall not, itself, be deleterious or harmful. Thus, the common inorganic bleaching agents, such as chlorine and nitrogen oxides, although cheap and efficient, are objectionable because of their harmful nature in foods or food products. Benzoyl peroxide, though relatively very expensive as compared with inorganic bleaching agents, has, therefore, been used for the bleaching of flour and other food products. It is, however, not only expensive, but belongs to a class of substances the use of which in food stuffs has been considered harmful and has, therefore, been restricted. Moreover, as the solubility of benzoyl peroxide in fats and oils is negligible or very slight, its effectiveness for bleaching substances in which the coloring constituent is contained in an oily or waxy vehicle, is correspondingly limited. Furthermore, as benzoyl peroxide does not form a food product as the result of the bleaching action, it introduces a non-food constituent into the bleached product and is, therefore, not as desirable as a peroxide that itself forms a food product as the result of the bleaching action.

An object of our present invention is, therefore, to provide an inexpensive, effective and efficient bleaching agent that is applicable to food stuffs and that does not introduce or leave a deleterious substance in the bleached product.

Another object of our invention is to provide a bleaching agent in the nature of a food product, or that, as a result of the bleaching action, forms a food product in the bleached material.

Further objects and features of the invention are to activate and render more active and efficient for the bleaching of food stuffs, peroxidized food materials or peroxids of the higher fatty acids, and to provide improved methods for the bleaching of food products by means of activated organic peroxids.

In accordance with our invention, a halogen derivative of an organic peroxid, and particularly a halogen derivative or derivatives of a fatty acid peroxide, or of a mixture of fatty acid peroxids, are formed and used for bleaching flour and other milling or food products. Through the substitution of a halogen, such as chlorine, for a hydrogen atom of the fatty acid peroxide, the peroxid is rendered much more active and more efficient in proportion to its active oxygen content than is the unsubstituted peroxid. Any halogen derivative of a fatty acid peroxid, or mixture of derivatives of such peroxids, may be employed. A chlorine derivative is, however, preferred. The mixed fatty acids produced from the fatty acid content of a naturally occurring fat or oil, as for example, cocoanut oil, are particularly suited as a source of the substituted organic peroxids, as peroxides made from these naturally occurring fats are not only less expensive than peroxids made from the individual fatty acids that are commercially available, for example, oleic or stearic acid but, as they have a lower average molecular weight than that of the individual fatty acids commercially available, the peroxids have a higher percentage of active oxygen. Consequently, a smaller quantity of the bleaching agent is required for a given bleaching action.

The halogen derivatives of the fatty acid peroxids are not only active and efficient oxidizing and bleaching agents, but are also soluble in oils and fats. This is an advantage inasmuch as the coloring matters that are to be oxidized by the bleaching agent are frequently dissolved or carried in oily or waxy material, even in the case of flour and other milling materials, and thus not readily accessible to agents insoluble in fats. By dissolving in a common solvent with the coloring constituents, the active peroxids are brought into intimate contact therewith for the most efficient action.

In bleaching a substance such as flour, with a halogen substituted fatty acid peroxid or a mixture of halogen substituted fatty acid peroxids, the peroxid may be sprayed directly in a finely divided condition into the flour or, it may be dissolved in an oil solvent and sprayed into the flour as described in co-pending application Serial No. 314,545.

The halogen peroxid derivatives or mixture of derivatives for use in accordance with our invention may be formed in any suitable manner. In the preferred form of the invention, however, chlorinated acid chlorides are formed from the fatty acid and is then peroxidized by a suitable peroxidizing agent. In forming chlorinated acid chlorides from cocoanut oil fatty acids having an average molecular weight of 205, 615 parts by weight of the fatty acid, equivalent to 3 moles of the fatty acid, are mixed with about 206 parts by weight of phosphorous trichloride and allowed to stand for about 48 hours, at room temperature, to essentially complete the reaction. It will be understood that when acids or other molecular weights are used, the proportion of fatty acid will be varied accordingly. The separated phosphorous acid is then removed from the acid chloride product. The acid chloride product, the weight of which will now have been increased to about 715 parts through the absorption of chlorine, is cooled with ice, and chlorine is passed into it until the product gains in weight about 15%, i. e., 113 parts, the total weight of the product increasing to 828 parts. The temperature during this chlorination should be near 0° C., and preferably should not exceed about 30° C. The product is a fatty acid chloride having its chain chlorinated to about 15%. The chlorine is attached principally to the alpha carbon atom, that is, the carbon atom adjacent to the carboxyl chloride group. The chlorinated acid chloride thus obtained is peroxidized in the following manner and proportion:

In a vessel fitted with an agitator, 700 cc. of 7.5% hydrogen peroxide are placed. To this is added 1 litre of 1% soap solution. The mixed solution is cooled to 0° C., by chipped ice. To this are added simultaneously 309 grams of the above chlorinated acid chloride and 245 cc. of caustic soda solution containing 342.6 grams of NaOH per litre. The mixture is continuously agitated for about seven minutes or, until the odor of acid chloride disappears, the temperature being kept near 0° C., by the continued addition of chipped ice. The reaction product is then acidified and the oily peroxid is separated from the water. It may then be taken up in a mineral oil solvent, if desired. The peroxid is dried with anhydrous magnesium sulphate, or a similar drying material, and is filtered or decanted, when it is ready as a bleaching composition.

The mixture of chlorinated fatty acid peroxide or peroxides, either alone or dissolved in a mineral oil solvent, as described in a co-pending application Serial No. 314,545, is intimately mixed with the flour by spraying, or any other suitable manner and, in somewhat less proportion than would be required if unchlorinated fatty acid peroxids are used. The treated flour is allowed to stand, at room temperature, for about 48 to 96 hours, at the end of which time it will be found efficiently bleached.

The halogenated fatty acid peroxids, as well as their mineral oil solutions, have a lower melting point than the corresponding unsubstituted or non-halogenated peroxids. This is of advantage in that it permits the substituted peroxids to be sprayed as liquids in cold weather at temperatures at which the unsubstituted or non-halogenated peroxids would solidify.

The fatty acid peroxids are relatively easy and safe to make and handle. They are more readily soluble in oils than other organic peroxids and are, therefore, particularly well suited for the bleaching of oils or of other materials the coloring matter of which is dissolved or contained in the oily constituents of such material, as for example, in flour, seed meals, egg yolk and the like. Furthermore, the chlorinated fatty acid peroxids, after their bleaching action, leave a residue which is a harmless food product, the chlorine being not free, but combined in the fatty acid. The stability of the peroxid is somewhat greater when saturated, or substantially saturated fatty acids, or hydrogenated cocoanut oil fatty acids are used as the source of the chlorinated fatty acid peroxid and saturated fatty acids are, therefore, preferable for this reason. If unsaturated fatty acids are to be used, they may be saturated by chlorine, or equivalent, before being used for the preparation of the peroxid.

As changes of operation could be made within the scope of our invention, it is intended that all matter contained in the above description shall be interpreted as illustrative and not in a limiting sense.

Having now described our invention, what we claim as new and desire to secure by Letters Patent is:

1. A halogenated peroxide of a soap forming fatty acid.

2. A chlorinated peroxide of a soap forming fatty acid.

3. A mixture of peroxide of the halogenated substitution products of the fatty acids contained in a natural fatty material.

4. A mixture of peroxides of the halogen substitution products of the fatty acids occurring in cocoanut oil.

5. A mixture of peroxides of the chlorine substitution products of the fatty acids occurring in cocoanut oil.

6. A process of forming a bleaching agent which comprises peroxidizing a chlorinated fatty acid chloride.

7. A process of forming an activated product of the type described which comprises forming a halogenated fatty acid chloride, and peroxidizing said chloride.

8. A process of forming an activated product of the type described which comprises treating a fatty acid chloride with chlorine to form a chlorine substitution product, and peroxidizing said substitution product.

9. A process for forming a bleaching agent which comprises peroxidizing a mixture of the chlorinated chlorides of cocoanut oil fatty acids.

10. A process of forming an activated product of the type described which comprises treating a mixture of the acid chlorides of cocoanut oil fatty acids with chlorine to form a mixture of chlorine substitution products, and peroxidizing said substitution products in said mixture.

In witness whereof we have hereunto set our hands this 9th day of November, 1928.

PHILIP E. ROLLHAUS.
WILLIAM B. STODDARD.